G. B. McINROY.
HEADLIGHT INDICATOR.
APPLICATION FILED NOV. 10, 1920.

1,412,411. Patented Apr. 11, 1922.

INVENTOR
George B. McInroy.
BY
Harry C. Schroeder
ATTORNEYS

UNITED STATES PATENT OFFICE.

GEORGE B. McINROY, OF OAKLAND, CALIFORNIA.

HEADLIGHT INDICATOR.

1,412,411.

Specification of Letters Patent.  Patented Apr. 11, 1922.

Application filed November 10, 1920. Serial No. 423,060.

*To all whom it may concern:*

Be it known that I, GEORGE B. McINROY, a citizen of the United States, residing at Oakland, in the county of Alameda and State of California, have invented certain new and useful Improvements in Headlight Indicators, of which the following is a specification.

My invention is a headlight indicator for indicating to the driver of an automobile that the headlight is lighted.

Referring to the annexed drawing in which my invention is illustrated and which forms a part of this specification:

Figure 1:
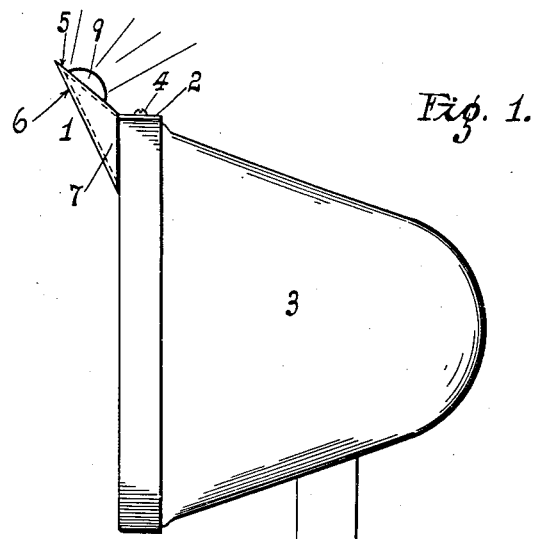
Figure 1 is a side view of a headlight and my indicator attached thereto.
Figure 2:
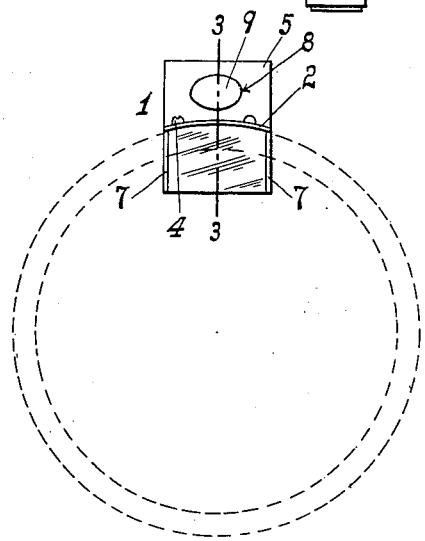
Figure 2 is a rear view of my indicator, the headlight being indicated in dotted lines.
Figure 3:
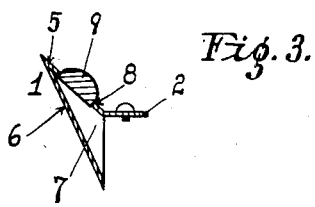
Figure 3 is a vertical longitudinal sectional view taken on line 3—3 of Figure 2.

My invention includes a hood 1 formed with a base plate 2, secured to the upper forward part of an automobile headlight 3 by screws 4; an upper wall 5 extending upwardly and forwardly at an angle from the the forward edge of said base plate; a reflecting wall 6 extending downwardly and rearwardly at an angle from the upper forward edge of said upper wall; and side walls 7 secured to the side edges of said upper and reflecting walls. An opening 8 is provided in the upper wall 5 in which is fitted a lens 9 which may be green or any other suitable color.

The rays of light of the lamp enter the open rear of the hood and are reflected upwardly and rearwardly at an angle through the lens 9. The driver seeing the light projected through said lens knows that the headlight is lighted.

Having described my invention, I claim:

1. A headlight indicator including a hood formed with a base plate adapted to be secured to the upper forward part of a headlight, an upper wall extending upwardly and forwardly at an angle from the forward edge of said base plate, a reflecting wall extending downwardly and rearwardly at an angle from the forward upper edge of said upper wall, said upper wall having a light opening.

2. A headlight indicator including a hood formed with a base plate adapted to be secured to the upper forward part of a headlight, an upper wall extending upwardly and forwardly at an angle from the forward edge of said base plate, a reflecting wall extending downwardly and rearwardly at an angle from the forward upper edge of said upper wall, and side walls secured to the side edges of said upper and said reflecting walls, said upper wall provided with a light opening.

3. A headlight indicator including a hood, means for securing said indicator to the headlight, an inclined upper wall extending from the headlight, a reflecting wall extending downwardly from the upper wall at an angle, said upper wall having a light opening.

In testimony whereof I affix my signature.

GEORGE B. McINROY.